US012435969B2

(12) United States Patent
Nomaru (10) Patent No.: US 12,435,969 B2
(45) Date of Patent: Oct. 7, 2025

(54) THICKNESS MEASURING APPARATUS (71) Applicant: DISCO CORPORATION, Tokyo (JP)

(72) Inventor: Keiji Nomaru, Tokyo (JP)

(73) Assignee: DISCO CORPORATION, Tokyo (JP)

(*) Notice: Subject to any disclaimer, the term of this patent is extended or adjusted under 35 U.S.C. 154(b) by 411 days.

(21) Appl. No.: 18/149,883

(22) Filed: Jan. 4, 2023

(65) Prior Publication Data

US 2023/0228558 A1 Jul. 20, 2023

(30) Foreign Application Priority Data

Jan. 14, 2022 (JP) .................. 2022-004129

(51) Int. Cl.
*G01B 11/06* (2006.01)
(52) U.S. Cl.
CPC .................... *G01B 11/06* (2013.01)
(58) Field of Classification Search
CPC . G01B 11/06; G01B 11/0675; G01B 11/2441; G01B 11/03; G01B 9/02043; G01B 9/02044; G01B 2210/56; G01N 21/17; H01L 22/12; B24B 37/005; B24B 49/12
See application file for complete search history.

(56) References Cited

U.S. PATENT DOCUMENTS

| | | | | |
|---|---|---|---|---|
| 2004/0027579 A1* | 2/2004 | Lee | .................... | G01B 9/02022 356/504 |
| 2016/0027696 A1* | 1/2016 | Nagaoka | ............. | H01L 21/6835 438/14 |
| 2020/0103220 A1* | 4/2020 | Kimura | .................. | B24B 49/12 |
| 2020/0208962 A1 | 7/2020 | Kimura et al. | | |
| 2020/0217641 A1* | 7/2020 | Kimura | .................. | G02B 27/14 |
| 2020/0340801 A1 | 10/2020 | Kimura et al. | | |

FOREIGN PATENT DOCUMENTS

| | | | |
|---|---|---|---|
| JP | 2001124532 A | | 5/2001 |
| JP | 2011122894 A | | 6/2011 |
| JP | 2012021916 A | * | 2/2012 |
| JP | 2020106277 A | | 7/2020 |
| JP | 2020176999 A | | 10/2020 |

OTHER PUBLICATIONS

Office Action issued in counterpart Japanese patent application No. 2022-004129, dated Aug. 26, 2025.

* cited by examiner

Primary Examiner — Kara E. Geisel
Assistant Examiner — Christina I Xing
(74) Attorney, Agent, or Firm — Greer Burns & Crain Ltd.

(57) ABSTRACT

A measuring instrument includes a light source, a scanning mirror configured to position the light emitted by the light source at coordinates specified by an X-coordinate and a Y-coordinate on a plate-shaped workpiece held on a chuck table, a diffusing film onto which reflected light is projected, the reflected light forming a spectral interference waveform by being reflected from a top surface and an undersurface of the plate-shaped workpiece held on the chuck table, a light detector configured to detect light intensities corresponding to wavelengths of the spectral interference waveform projected onto the diffusing film, a memory configured to store, for each coordinate, the light intensities corresponding to the wavelengths and being detected by the light detector, and a calculating section configured to calculate a thickness at each coordinate by performing a Fourier transform of the light intensities corresponding to the wavelengths and being stored in the memory.

11 Claims, 5 Drawing Sheets

THICKNESS MEASURING APPARATUS

BACKGROUND OF THE INVENTION

Field of the Invention

The present invention relates to a thickness measuring apparatus that measures the thickness of a plate-shaped workpiece.

Description of the Related Art

A wafer having a plurality of devices such as integrated circuits (ICs) or large scale integration (LSI) circuits formed on a top surface thereof to be demarcated by a plurality of intersecting planned dividing lines is thinned by the undersurface of the wafer being ground by a grinding apparatus. The wafer is then divided into individual device chips by a dicing apparatus or a laser processing apparatus. The divided device chips are used in an electronic apparatus such as a mobile telephone or a personal computer.

The grinding apparatus that grinds the undersurface of the wafer generally includes a chuck table that holds the wafer, a grinding unit that has, in a rotatable manner, a grinding wheel that grinds the wafer held on the chuck table, and a measuring instrument that measures the thickness of the wafer held on the chuck table. The grinding apparatus can process the wafer to a desired thickness.

The grinding surface of the wafer is damaged when a contact type measuring instrument that measures the thickness of the wafer by bringing a prober into contact with the grinding surface is used as the measuring instrument described above. Accordingly, used is a noncontact type measuring instrument which measures the thickness by applying light from the grinding surface of the wafer and performing a Fourier transform of a spectral interference waveform between light reflected from the grinding surface of the wafer and light transmitted through the wafer and reflected from an opposite surface (see Japanese Patent Laid-Open No. 2012-21916, for example).

In addition, also in a case where a modified layer is formed inside the wafer by application of a laser beam having a wavelength transmissible through the wafer while the condensing point of the laser beam is positioned inside the wafer, the thickness of the wafer is measured according to the spectral interference waveform between the light reflected from the top surface of the wafer and the light reflected from the undersurface of the wafer (see Japanese Patent Laid-Open No. 2011-122894, for example).

SUMMARY OF THE INVENTION

The technology described in Japanese Patent Laid-Open No. 2012-21916 or Japanese Patent Laid-Open No. 2011-122894 described above adopts a configuration that disperses return light reflected from the upper surface and the lower surface of the wafer by a diffraction grating, computes the light intensity of each wavelength, and detects the thickness of the wafer. The detection of the thickness in an entire area of the wafer necessitates changing an irradiation position by moving the position of the wafer held on the chuck table, and thus takes time.

It is accordingly an object of the present invention to provide a measuring apparatus that can measure the thickness of a plate-shaped workpiece in a short period of time.

In accordance with an aspect of the present invention, there is provided a thickness measuring apparatus for measuring a thickness of a plate-shaped workpiece, the thickness measuring apparatus including a chuck table having, as a holding surface, an X-axis and Y-axis surface configured to hold the plate-shaped workpiece, and a measuring instrument configured to measure the thickness of the plate-shaped workpiece held on the chuck table, the measuring instrument including a light source configured to emit light in a predetermined wavelength range, a scanning mirror configured to position the light emitted by the light source at coordinates specified by an X-coordinate and a Y-coordinate on the plate-shaped workpiece held on the chuck table, a diffusing film onto which reflected light is projected, the reflected light forming a spectral interference waveform by being reflected from a top surface and an undersurface of the plate-shaped workpiece held on the chuck table, a light detector configured to detect light intensities corresponding to wavelengths of the spectral interference waveform projected onto the diffusing film, a memory configured to store, for each coordinate, the light intensities corresponding to the wavelengths and being detected by the light detector, and a calculating section configured to calculate a thickness at each coordinate by performing a Fourier transform of the light intensities corresponding to the wavelengths and being stored in the memory.

Preferably, the measuring instrument further includes a wavelength switching unit configured to switch the light emitted by the light source to each wavelength with a time difference, the light detector detects the light intensity of each wavelength projected onto the diffusing film, for each wavelength, and the memory stores the light intensity of each wavelength in correspondence with the coordinates. Preferably, the thickness measuring apparatus further includes a branching unit configured to branch the light emitted by the light source into each wavelength, the light detector detects the light intensity of each wavelength projected onto the diffusing film, and the memory stores the light intensity of each wavelength in correspondence with the coordinates.

Preferably, the light source is a wide band light source or a multiple wavelength light source. Preferably, in a case where the measuring instrument includes wavelength switching means for switching the light emitted by the light source to each wavelength with a time difference, one of a camera, a line sensor, a photodiode (PD), and a photomultiplier tube (PMT) is employed as the light detector. Preferably, in a case where the measuring instrument includes a branching unit configured to branch the light emitted by the light source into each wavelength, either a camera or a line sensor is employed as the light detector.

Preferably, the measuring instrument further includes a Z-axis moving mechanism configured to move the chuck table in a Z-axis direction perpendicular to an X-axis and a Y-axis, and the chuck table is positioned in the Z-axis direction to follow an X-coordinate and a Y-coordinate of the light positioned at the plate-shaped workpiece by the scanning mirror, such that an interval of each wavelength projected onto the diffusing film is constant. Preferably, in a case where the diffusing film is of a transmission type, the light detector is disposed on a back side of the diffusing film, and in a case where the diffusing film is of a reflection type, the light detector is disposed on a front side of the diffusing film.

According to the present invention, thicknesses at a plurality of desired coordinate positions in the plate-shaped workpiece can be measured according to the speed of the scanning mirror, so that a problem of being unable to measure the thicknesses at the plurality of positions in the plate-shaped workpiece in a short period of time is solved.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
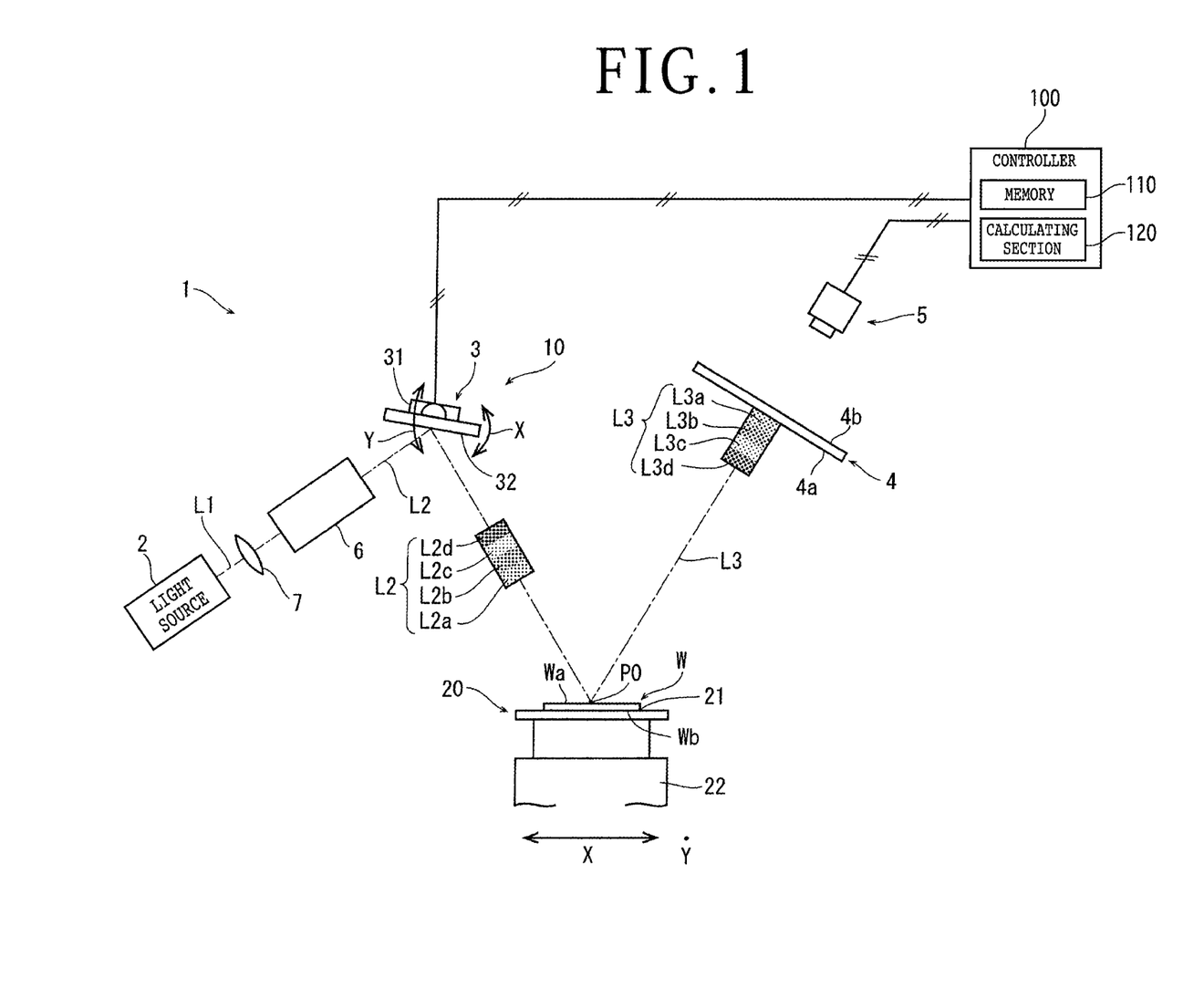
FIG. 1 is a simplified diagram of a thickness measuring apparatus according to an embodiment of the present invention.

A thickness measuring apparatus according to an embodiment of the present invention will hereinafter be described in detail with reference to the accompanying drawings. FIG. 1 illustrates a simplified diagram depicting a configuration of a thickness measuring apparatus 1 according to the present embodiment. The thickness measuring apparatus 1 is an apparatus that measures the thickness of a plate-shaped workpiece. The thickness measuring apparatus 1 includes at least a chuck table 20 that holds a wafer W as one kind of a plate-shaped workpiece with a flat surface defined by X-coordinates and Y-coordinates as a holding surface 21, and a measuring instrument 10 that measures the thickness of the wafer W held on the chuck table 20.

The measuring instrument 10 includes a light source 2 that emits light in a predetermined wavelength range, a scanning mirror 3 that positions light L1 emitted by the light source 2 at the wafer W held on the chuck table 20, that is, at a desired coordinate position specified by an X-coordinate and a Y-coordinate on the wafer W, a diffusing film 4 onto which reflected light L3 is projected, the reflected light L3 having light intensities corresponding to wavelengths based on a spectral interference waveform generated by reflection from a top surface Wa and an undersurface Wb of the wafer W held on the chuck table 20, a light detector 5 that detects the light intensities corresponding to the wavelengths projected onto the diffusing film 4, a memory 110 that stores, for each coordinate, the light intensities corresponding to the wavelengths which are detected by the light detector 5, and a calculating section 120 that calculates a thickness at each coordinate by performing a Fourier transform of the light intensities corresponding to the wavelengths which are stored in the memory 110. Incidentally, in the present embodiment, the memory 110 and the calculating section 120 described above are arranged in a controller 100 disposed in the thickness measuring apparatus 1. In the embodiment illustrated in FIG. 1, the light L1 emitted from the light source 2 is converted into collimated light by a collimating lens 7, and is guided to a wavelength switching unit 6 disposed between the collimating lens 7 and the scanning mirror 3. The wavelength switching unit 6 is means for switching the incident light L1 to each wavelength with a time difference.

The light source 2 can be selected from a wide band light source or a multiple wavelength light source as appropriate. In the case of the wide band light source, a light source that applies light including wavelengths of 450 to 900 nm substantially uniformly, for example, is employed. In the case of the multiple wavelength light source, a light source that discretely emits light of a plurality of wavelengths at equal intervals in a range of 450 to 900 nm, for example, is employed. The light source 2 in the present embodiment is selected from a super continuum (SC) light source and a super luminescent diode (SLD) light source, for example.

The scanning mirror 3 is a galvanoscanner, for example. The scanning mirror 3 allows a reflecting mirror 32 to be controlled to a desired direction at high speed by controlling a driving unit 31 by the controller 100. The scanning mirror 3 in the present embodiment rotates the reflecting mirror 32 in an X-axis direction and a Y-axis direction by the driving unit 31. Light L2 applied from the wavelength switching unit 6 is thereby reflected and positioned at a desired measurement position defined by an X-coordinate and a Y-coordinate on the wafer W held on the chuck table 20. It is to be noted that the scanning mirror 3 in the present invention is not limited to the galvanoscanner illustrated in the figure. A well-known configuration can be adopted as long as the scanning mirror 3 is a mirror used for what is generally called laser scanning. For example, the scanning mirror 3 may include an X-axis mirror that changes the irradiation position of the light on the wafer W only in the X-axis direction and a Y-axis mirror that changes the irradiation position of the light on the wafer W only in the Y-axis direction.

The wavelength switching unit 6 illustrated in FIG. 1 includes, for example, what is generally called a sweep device that changes the light L1 emitted from the light source 2 into the light L2 having a time difference for each wavelength, and applies the light L2. More specifically, the wavelength switching unit 6 can be implemented by use of an optical fiber that causes wavelength dispersion, and is implemented by a diffraction grating whose reflection position is different for each wavelength being disposed in a long optical fiber and settings being made such that the reflection distance of light having a short wavelength is short and the reflection distance of light having a long wavelength is long. Thus, as conceptually illustrated in FIG. 1, the light L2 emitted from the wavelength switching unit 6 includes blue light L2a, which has a short wavelength and is applied earliest, as well as green light L2b, yellow light L2c, and red light L2d thereafter applied in increasing order of wavelength. Incidentally, in the embodiment illustrated in FIG. 1, for the convenience of description, the wavelength switching unit 6 has been described as including light of four kinds of wavelengths (the blue light L2a, the green light L2b, the yellow light L2c, and the red light L2d). However, in practice, light that changes with a time difference for each wavelength with finer gradations at boundary parts between the respective colors is generated and applied, and is dispersed into a large number of wavelengths at finer intervals.

As is understood from the figure, irradiating a measurement position (P0) of the wafer W held on the chuck table 20 with the above-described light L2 generates the reflected light L3 which has light intensities corresponding to the wavelengths based on the spectral interference waveform generated by reflection from the top surface Wa and the undersurface Wb of the wafer W. The reflected light L3 is projected onto a front surface 4a of the diffusing film 4 in order of the wavelengths in which time differences are formed by the wavelength switching unit 6, that is, in order of blue light L3a, which has a short wavelength and is applied earliest, green light L3b, yellow light L3c, and red light L3d. The light intensities corresponding to the wavelengths based on the spectral interference waveform are then detected on a back surface 4b side of the diffusing film 4. The above-described diffusing film 4 is what is generally called a light diffusing film of a transmission type which has a function of diffusing incident light brightly and uniformly.

As illustrated in FIG. 1, the light detector 5 is disposed on the back surface 4b side of the light diffusing film 4. The light detector 5 can, for example, be selected from a camera including a complementary metal oxide semiconductor (CMOS) sensor, a PD, a PMT, a line sensor, or the like. The light detector 5 in the present embodiment is a camera including a CMOS sensor, for example, and includes a plurality of pixels defined to correspond to a two-dimensional region specified by X-coordinates and Y-coordinates of a region irradiated with the light L2 on the wafer W. The light detector 5 detects the spectral interference waveform by detecting, with time differences, the light intensities corresponding to the wavelengths of the reflected light L3 received sequentially with the time differences caused by the action of the wavelength switching unit 6, and stores the light intensities in the memory 110 of the controller 100 for each coordinate of the wafer W. The light intensities of the reflected light L3 which are stored in the memory 110 are subjected to computation (Fourier transform) by the calculating section 120 of the controller 100. A thickness at each coordinate position of the wafer W is thereby calculated. Information regarding the thicknesses calculated by the calculating section 120 is stored in the memory 110 of the controller 100.

The thickness measuring apparatus 1 according to the present embodiment generally has the configuration as described above. A mode of measuring the thickness of the plate-shaped workpiece by the present embodiment will be described more specifically.

Figure 2:
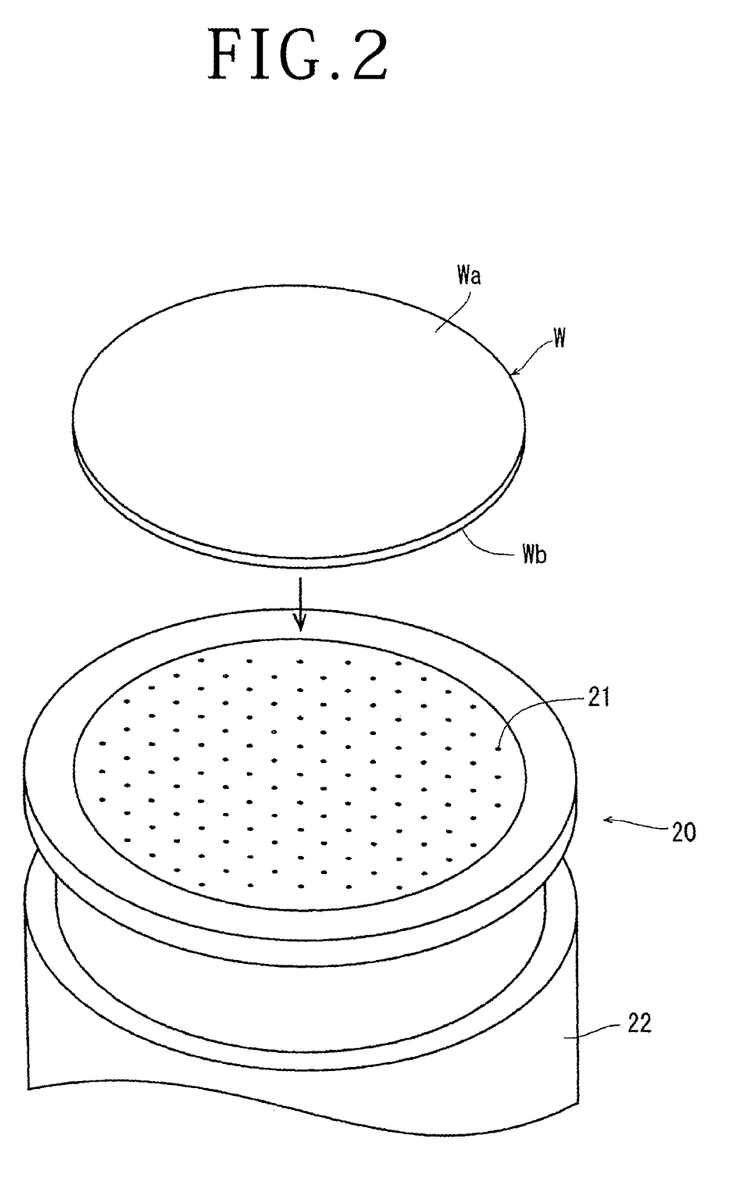
FIG. 2 is a perspective view depicting a manner of holding a wafer on a chuck table of the thickness measuring apparatus illustrated in FIG. 1.

FIG. 2 illustrates the wafer W of silicon (Si) whose thickness is to be measured by the thickness measuring apparatus 1 according to the present embodiment. The wafer W is mounted on the holding surface 21 supported by a cylindrical member 22 of the chuck table 20 of the thickness measuring apparatus 1 with the top surface Wa of the wafer W oriented upward and with the undersurface Wb thereof oriented downward. The holding surface 21 is a flat surface defined by an X-axis and a Y-axis, and is formed by a member having air permeability. Unillustrated suction means is connected to the holding surface 21. A negative pressure is generated on the holding surface 21 by actuation of the suction means. The wafer W is thereby held under suction.

Figure 3:
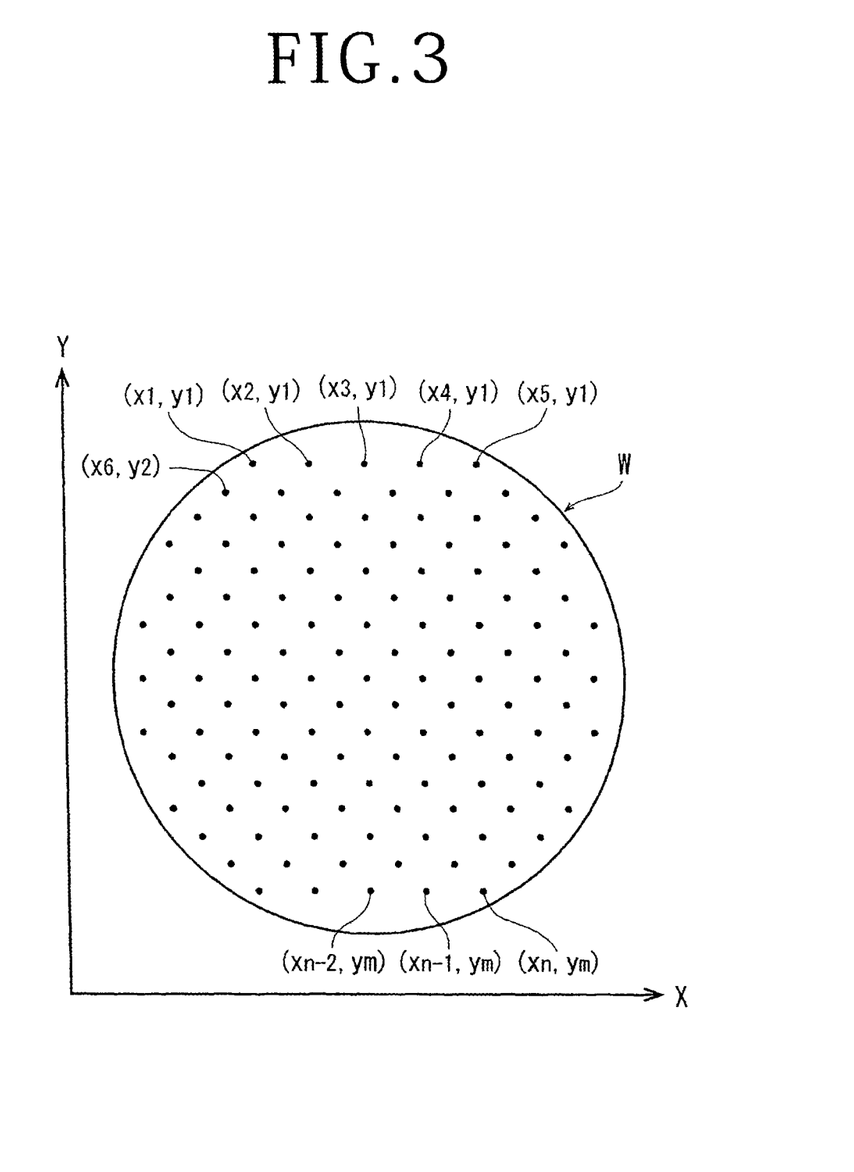
FIG. 3 is a plan view of the wafer whose thickness is measured by the thickness measuring apparatus illustrated in FIG. 1.

FIG. 3 illustrates a plan view of the wafer W held on the chuck table 20. Predetermined measurement positions specified by X-coordinates and Y-coordinates on the wafer W illustrated in the figure, that is, $(x_1, y_1)$, $(x_2, y_1)$, $(x_3, y_1)$, $(x_4, y_1)$, . . . , $(x_{n-1}, y_m)$, and $(x_n, y_m)$, are irradiated with the light L2 by actuation of the light source 2 and the scanning mirror 3 of the thickness measuring apparatus 1 (display of coordinates is partly omitted in FIG. 3). The light L2 in the present embodiment goes through the wavelength switching unit 6, and thus includes the blue light L2a, the green light L2b, the yellow light L2c, and the red light L2d having a time difference for each wavelength. As illustrated in FIG. 1, for example, the light L2 is applied to the measurement position P0 of the wafer W, and forms the reflected light L3 having the light intensities corresponding to the wavelengths based on the spectral interference waveform generated according to the thickness by reflection from the top surface Wa and the undersurface Wb of the wafer W. The reflected light L3 is constituted by the blue light L3a, the green light L3b, the yellow light L3c, and the red light L3d dispersed with time differences. The reflected light L3 is projected onto the front surface 4a of the diffusing film 4, and the light intensities having a time difference for each wavelength are detected by the light detector 5 from the back surface 4b side of the diffusing film 4. When the light intensities having a time difference for each wavelength are thus detected at all of measurement positions specified by X-coordinates and Y-coordinates on the wafer W, the light intensity of each wavelength is stored in the memory 110 for each coordinate position specified by an X-coordinate and a Y-coordinate, as illustrated on the right side of FIG. 4.

Figure 4:
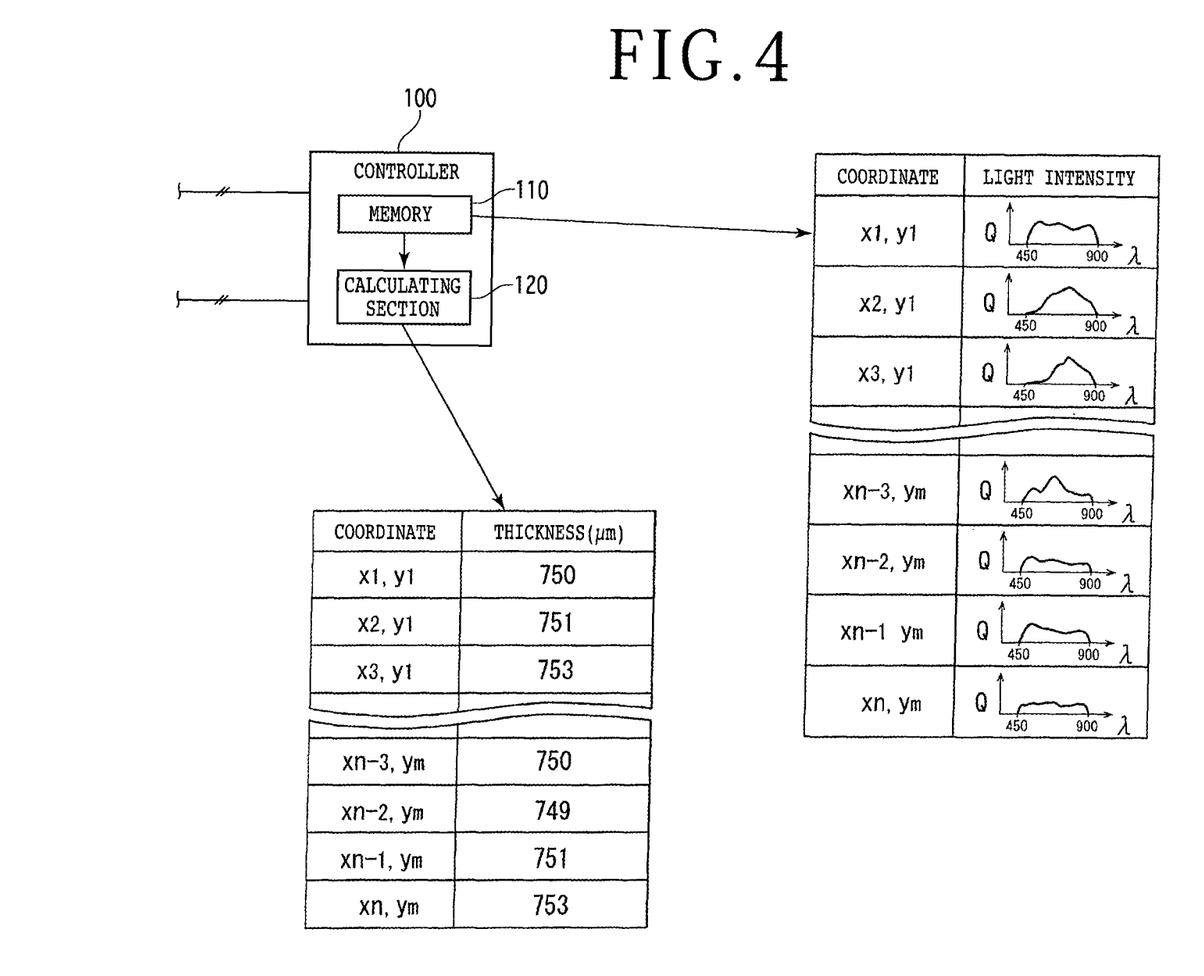
FIG. 4 is a conceptual diagram depicting light intensities stored in a controller of the thickness measuring apparatus illustrated in FIG. 1 and information regarding calculated thicknesses.

The calculating section 120 included in the controller 100 calculates a thickness at each coordinate, as illustrated on the lower side of FIG. 4, by performing a Fourier transform of the light intensities corresponding to the wavelengths which are stored in the above-described memory 110. Information regarding the calculated thickness at each coordinate is stored in the memory 110 of the controller 100.

According to the foregoing embodiment, thicknesses at a plurality of desired coordinate positions in the plate-shaped workpiece (wafer W) can be measured according to the speed of the scanning mirror 3, so that a problem of being unable to measure the thicknesses at the plurality of positions in the wafer W in a short period of time is solved.

In a case where the thickness measuring apparatus 1 described above is applied to a grinding apparatus or a polishing apparatus not illustrated, productivity of grinding processing or polishing processing is improved because the thickness of the wafer W can be measured in a short period of time when the wafer W is ground or polished to a desired thickness. In addition, also in a case where the thickness measuring apparatus 1 described above is applied to a laser processing apparatus that forms a modified layer inside the wafer W by applying a laser beam having a wavelength transmissible through the wafer while positioning the condensing point of the laser beam inside the wafer, productivity is improved because the thickness of the wafer at a plurality of positions along a desired planned dividing line can be measured in a short period of time.

In the embodiment described above, there has been disclosed a configuration which guides the light L1 emitted by the light source 2 to the wavelength switching unit 6 that switches the light L1 to each wavelength with a time difference, forms the reflected light L3 by irradiating the wafer W via the scanning mirror 3 with the light L2 switched to each wavelength with a time difference by the wavelength switching unit 6, and detects the light intensity of each wavelength projected onto the diffusing film 4 by the light detector 5 for each wavelength. However, the present invention is not limited to this, and a thickness measuring apparatus 1' illustrated as another embodiment in FIG. 5 may be used. The thickness measuring apparatus 1' will be described with reference to FIG. 5. Incidentally, configurations identical with those of the thickness measuring apparatus 1 illustrated in FIG. 1 are identified by the same numbers, and detailed description thereof will be omitted.

Figure 5:
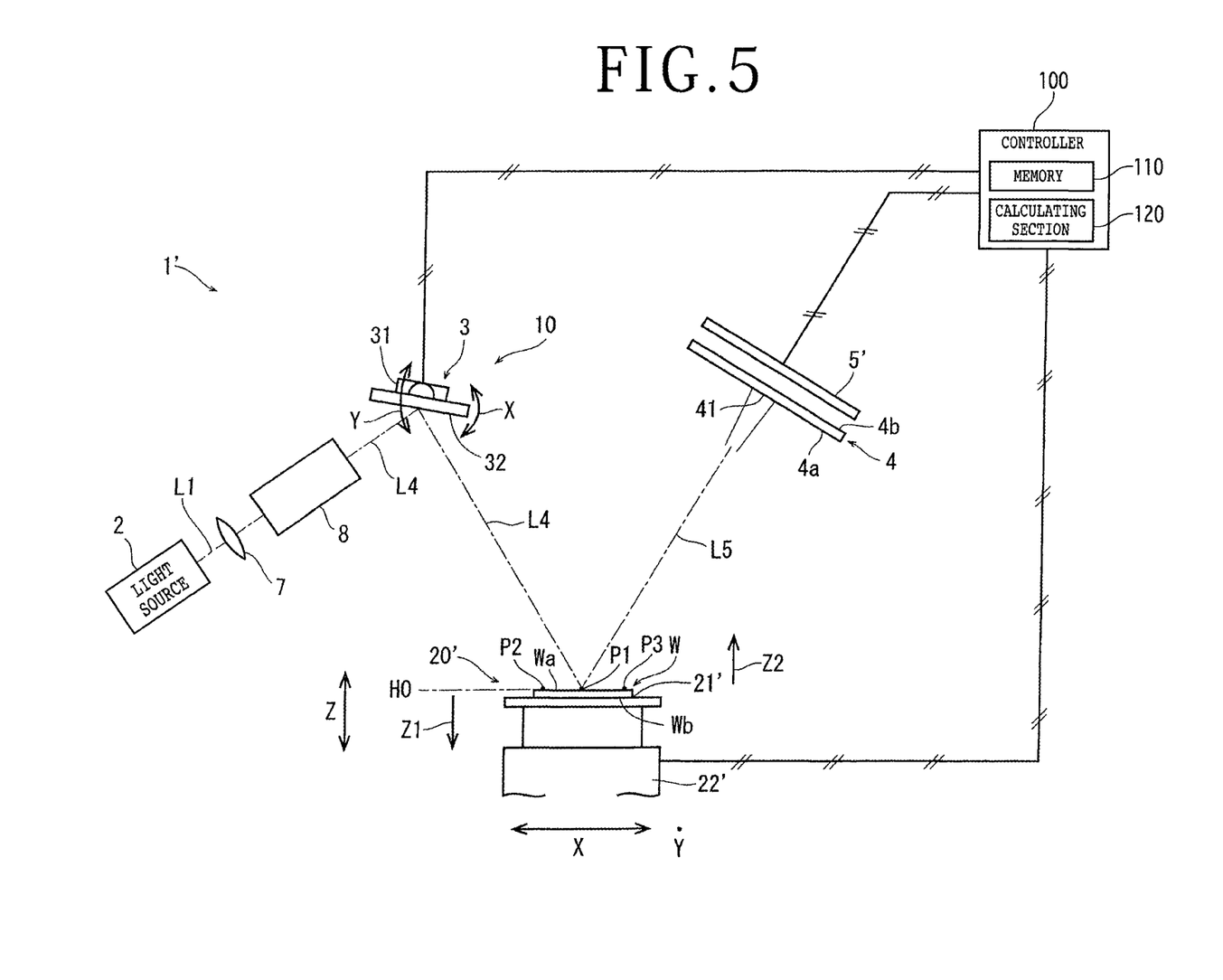
FIG. 5 is a simplified diagram depicting another embodiment of the thickness measuring apparatus according to the present invention.

The thickness measuring apparatus 1' illustrated in FIG. 5 includes a branching unit 8 that applies light L4 obtained by branching the light L1 emitted by the light source 2 into each wavelength in place of the wavelength switching unit 6 according to the foregoing embodiment. The branching unit 8 is a diffraction grating of a transmission type, for example. In addition, the thickness measuring apparatus 1' includes a chuck table 20'. The chuck table 20' has a holding surface 21' formed by a member having air permeability and connected to unillustrated suction means and a cylindrical member 22' including unillustrated raising and lowering means that is connected to the controller 100. The height of the holding surface 21' can be positioned at a desired position in a Z-axis direction indicated by an arrow Z in the figure by the action of the controller 100 and the raising and lowering means. The light L4 applied to the plate-shaped workpiece (wafer W) held on the holding surface 21' becomes reflected light L5 having light intensities corresponding to wavelengths based on a spectral interference waveform generated by reflection from the top surface Wa and the undersurface Wb of the wafer W, and the reflected light L5 is projected onto the front surface 4a of the diffusing film 4. A light detector 5' disposed on the back surface 4b side detects the light intensity of each wavelength of the reflected light L5 projected onto the diffusing film 4. Incidentally, a line sensor, for example, is employed as the light detector 5' of the thickness measuring apparatus 1' illustrated in FIG. 5. The light intensities of the reflected light L5 guided to the line sensor are detected by a plurality of light receiving elements arranged in series in the line sensor. A light intensity signal detected by the light detector 5' is sent to the controller 100 described above, and a thickness at each coordinate can be calculated by computation such as a Fourier transform. A procedure for measuring the thickness of the wafer W with use of the thickness measuring apparatus 1' will be described more specifically.

The wafer W whose top surface Wa is oriented upward is mounted and held under suction on the holding surface 21' positioned at a height H0, for example, by the above-described raising and lowering means housed in the cylindrical member 22' in the chuck table 20' of the thickness measuring apparatus 1' illustrated in FIG. 5. Next, the light L1 applied by actuation of the light source 2 is converted into collimated light via the collimating lens 7, and is guided to the branching unit 8. The light L1 guided to the branching unit 8 is converted into the light L4 having a dispersed spread by being branched into each wavelength. The light L4 applied from the branching unit 8 is reflected by the reflecting mirror 32 of the scanning mirror 3 described above, and is applied to a predetermined measurement position P1 specified by an X-coordinate and a Y-coordinate on the wafer W held under suction on the holding surface 21' of the chuck table 20' by actuation of the driving unit 31 of the scanning mirror 3.

In the thickness measuring apparatus 1' illustrated in FIG. 5, the light L4 is dispersed by the light being branched into each wavelength by the branching unit 8. When the light L4 is applied to the measurement position P1 on the wafer W and then reflected, a spectral interference waveform generated by reflection from the top surface Wa and the undersurface Wb of the wafer W becomes the reflected light L5 that changes according to the thickness of the position irradiated with the light L4. When the reflected light L5 is projected onto the front surface 4a of the diffusing film 4, the light L4 is projected onto a position 41 of the diffusing film 4 with a predetermined width corresponding to the range of wavelengths of 450 to 900 nm which are dispersed by being branched by the branching unit 8, and the light detector 5' can detect light intensities in correspondence with the width from the back surface 4b side of the diffusing film 4. Thus, as illustrated on the right side of FIG. 4, the light intensity of each wavelength based on the spectral interference waveform is stored in the memory 110 to correspond to the X-coordinate and Y-coordinate of the measurement position P1.

Incidentally, when consideration is given to a case of measuring the thickness in the thickness measuring apparatus 1' illustrated in FIG. 5 by moving the light L4 applied from the branching unit 8 from the above-described measurement position P1 on the wafer W by actuation of the scanning mirror 3, and applying the light L4 to a position (for example, a measurement position P2 or P3) specified by another X-coordinate and the Y-coordinate, the reflected light L5 reflected at the measurement position P2 or P3 when the top surface Wa of the wafer W is at the height H0 changes in a distance travelled to reach the diffusing film 4 from the scanning mirror 3 as compared with the case of applying the light L4 to the measurement position P1, and the interval of each wavelength of the reflected light L5 projected onto the front surface 4a of the diffusing film 4 changes. As a result, the light detector 5' cannot accurately detect the spectral interference waveform forming the light intensities corresponding to the wavelengths, nor can the thickness of the wafer W be calculated correctly. Accordingly, in the present embodiment, the above-described raising and lowering means is actuated to follow the X-coordinate and Y-coordinate of the light L4 positioned at the wafer W by the scanning mirror 3 to coincide with the interval of each wavelength as a reference, for example, the interval of each wavelength of the reflected light L5 projected onto the front surface 4a of the diffusing film 4 in a case where the height of the top surface Wa of the wafer W is positioned at H0 and the measurement position P1 is irradiated with the light L4. The height of the holding surface 21' of the chuck table 20' is thus moved in a direction indicated by an arrow Z1 or Z2 and positioned at a desired position in the Z-axis direction.

In the thickness measuring apparatus 1' according to the embodiment described above, the height of the holding surface 21' of the chuck table 20' is moved in the direction indicated by the arrow Z1 or Z2 and positioned at a desired position in the Z-axis direction to follow the X-coordinate and Y-coordinate of the light L4 positioned at the wafer W by the scanning mirror 3. Consequently, the distance travelled to reach the diffusing film 4 from the scanning mirror 3 does not change, and the interval of each wavelength of the reflected light L5 projected onto the front surface 4a of the diffusing film 4 becomes constant. The thickness of the wafer W can hence be measured accurately at any measurement position.

As with the above-described thickness measuring apparatus 1, the above-described thickness measuring apparatus 1' can also measure thicknesses at a plurality of desired coordinate positions in the plate-shaped workpiece (wafer W) according to the speed of the scanning mirror 3, so that the problem of being unable to measure the thickness of the wafer W in a short period of time is solved. It is to be noted that, while an example in which the light detector 5' includes a line sensor in the thickness measuring apparatus 1' described above has been illustrated, the present invention is not limited to this, and the camera used in the thickness measuring apparatus 1 described above, for example, can also be used.

Also in a case where the thickness measuring apparatus 1' described above is applied to a grinding apparatus or a polishing apparatus not illustrated, productivity of grinding processing or polishing processing is improved because the thickness of the wafer W can be measured in a short period of time when the wafer W is ground or polished to a desired thickness. In addition, also in a case where the thickness measuring apparatus 1' described above is applied to a laser processing apparatus that forms a modified layer inside the wafer W by positioning, inside the wafer, the condensing point of a laser beam of a wavelength transmissible through the wafer and applying the laser beam, productivity is improved because the thickness of the wafer W at a plurality of positions along a desired planned dividing line can be measured in a short period of time.

Incidentally, in the foregoing embodiment, an example in which the diffusing film 4 is of a transmission type and the light detector 5 is disposed on the back surface 4b side of the diffusing film 4 has been illustrated. However, in a case where the diffusing film 4 is of a reflection type, similar functions can be produced by the light detector 5 or 5' being disposed on the front surface 4a side of the diffusing film 4.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A thickness measuring apparatus for measuring a thickness of a plate-shaped workpiece, the thickness measuring apparatus comprising:
    a chuck table having, as a holding surface, an X-axis and Y-axis surface configured to hold the plate-shaped workpiece; and
    a measuring instrument configured to measure the thickness of the plate-shaped workpiece held on the chuck table;
    the measuring instrument including;
        a light source configured to emit light in a predetermined wavelength range,
        a scanning mirror including at least one mirror configured to rotate in an X-axis direction and a Y-axis direction, such that a speed of the measurement of the thickness of the plate-shaped workpiece is controlled by a speed of rotation of the at least one mirror, and the at least one mirror is configured to position the light emitted by the light source at coordinates specified by an X coordinate and a Y-coordinate on the plate-shaped workpiece held on the chuck table,
        a diffusing film onto which reflected light is projected, the reflected light forming a spectral interference waveform by being reflected from a top surface and an undersurface of the plate-shaped workpiece held on the chuck table,
        a light detector configured to detect light intensities corresponding to wavelengths of the spectral interference waveform projected onto the diffusing film,
        a memory configured to store, for each coordinate, the light intensities corresponding to the wavelengths and being detected by the light detector, and
        a calculating section configured to calculate a thickness at each coordinate by performing a Fourier transform of the light intensities corresponding to the wavelengths and being stored in the memory.

2. The thickness measuring apparatus according to claim 1, wherein
    the measuring instrument further includes a wavelength switching unit configured to switch the light emitted by the light source to each wavelength with a time difference, the light detector detects the light intensity of each wavelength projected onto the diffusing film, for each wavelength, and the memory stores the light intensity of each wavelength in correspondence with the coordinates.

3. The thickness measuring apparatus according to claim 1, further comprising:
    a branching unit configured to branch the light emitted by the light source into each wavelength,
    wherein the light detector detects the light intensity of each wavelength projected onto the diffusing film, and the memory stores the light intensity of each wavelength in correspondence with the coordinates.

4. The thickness measuring apparatus according to claim 1, wherein
    the light source is a wide band light source or a multiple wavelength light source.

5. The thickness measuring apparatus according to claim 2, wherein
    the light detector is selected from a group consisting of a camera, a line sensor, a photodiode, and a photomultiplier tube.

6. The thickness measuring apparatus according to claim 3, wherein
    the light detector is selected from a group consisting of a camera and a line sensor.

7. The thickness measuring apparatus according to claim 3, wherein
    the measuring instrument further includes a Z-axis moving mechanism configured to move the chuck table in a Z-axis direction perpendicular to an X-axis and a Y-axis, and the chuck table is positioned in the Z-axis direction to follow an X-coordinate and a Y-coordinate of the light positioned at the plate-shaped workpiece by the scanning mirror, such that an interval of each wavelength projected onto the diffusing film is constant.

8. The thickness measuring apparatus according to claim 1, wherein,
    in a case where the diffusing film is of a transmission type, the light detector is disposed on a back side of the diffusing film, and in a case where the diffusing film is of a reflection type, the light detector is disposed on a front side of the diffusing film.

9. The thickness measuring apparatus according to claim 1, wherein, the at least one mirror includes an X-axis mirror that changes the irradiation position of the light on the plate-shaped workpiece only in the X-axis direction and a Y-axis mirror that changes the irradiation position of the light on the plate-shaped workpiece only in the Y-axis direction.

10. A thickness measuring apparatus for measuring a thickness of a plate-shaped workpiece, the thickness measuring apparatus comprising:
    a chuck table having, as a holding surface, an X-axis and Y-axis surface configured to hold the plate-shaped workpiece; and
    a measuring instrument configured to measure the thickness of the plate-shaped workpiece held on the chuck table;
    the measuring instrument including:
        a light source configured to emit light in a predetermined wavelength range, a scanning mirror configured to position the light emitted by the light source at coordinates specified by an X-coordinate and a Y-coordinate on the plate-shaped workpiece held on the chuck table, such that the light emitted by the light source directly contacts the plate-shaped workpiece after reflecting off the scanning mirror, a diffusing film onto which reflected light is directly projected after contacting the plate-shaped workpiece, the reflected light forming a spectral interference waveform by being reflected from a top surface and an undersurface of the plate-shaped workpiece held on the chuck table, a light detector configured to detect light intensities corresponding to wavelengths of the spectral interference waveform projected onto the diffusing film, a memory configured to store, for each coordinate, the light intensities corresponding to the wavelengths and being detected by the light detector, and a calculating section configured to calculate a thickness at each coordinate by performing a Fourier transform of the light intensities corresponding to the wavelengths and being stored in the memory.

11. The thickness measuring apparatus according to claim 10, wherein, the scanning mirror includes an X-axis mirror that changes the irradiation position of the light on the plate-shaped workpiece only in the X-axis direction and a Y-axis mirror that changes the irradiation position of the light on the plate-shaped workpiece only in the Y-axis direction.

* * * * *